(12) United States Patent
Winget et al.

(10) Patent No.: US 7,788,480 B2
(45) Date of Patent: Aug. 31, 2010

(54) PROTECTED DYNAMIC PROVISIONING OF CREDENTIALS

(75) Inventors: Nancy Cam Winget, Mountain View, CA (US); Mark Krischer, Lane Cove (AU); Ilan Frenkel, Tel-Aviv (IL); Hao Zhou, Solon, OH (US)

(73) Assignee: Cisco Technology, Inc., San Jose, CA (US)

( * ) Notice: Subject to any disclaimer, the term of this patent is extended or adjusted under 35 U.S.C. 154(b) by 981 days.

(21) Appl. No.: 10/702,167

(22) Filed: Nov. 5, 2003

(65) Prior Publication Data

US 2005/0097362 A1 May 5, 2005

(51) Int. Cl.
*H04L 29/06* (2006.01)
*G06F 15/173* (2006.01)
*G06F 15/16* (2006.01)

(52) U.S. Cl. .................. 713/150; 713/153; 713/168; 709/223

(58) Field of Classification Search .................. 713/150, 713/153, 155, 168; 726/17–19; 709/223, 709/230
See application file for complete search history.

(56) References Cited

U.S. PATENT DOCUMENTS

| | | | |
|---|---|---|---|
| 4,200,770 A | | 4/1980 | Hellman et al. |
| 6,397,056 B1 * | | 5/2002 | Bugnon et al. ............. 455/411 |
| RE38,070 E * | | 4/2003 | Spies et al. .................. 380/277 |
| 2002/0002613 A1 * | | 1/2002 | Freeman et al. ............. 709/225 |
| 2002/0157024 A1 * | | 10/2002 | Yokote ........................ 713/201 |
| 2002/0164022 A1 * | | 11/2002 | Strasser et al. .............. 380/201 |
| 2003/0226017 A1 * | | 12/2003 | Palekar et al. ............... 713/168 |
| 2004/0034772 A1 * | | 2/2004 | Alao ........................... 713/168 |
| 2004/0049585 A1 * | | 3/2004 | Swander ...................... 709/229 |
| 2004/0081321 A1 * | | 4/2004 | Struik .......................... 380/278 |
| 2004/0098581 A1 * | | 5/2004 | Balfanz et al. .............. 713/155 |
| 2004/0148430 A1 * | | 7/2004 | Narayanan ................... 709/238 |
| 2004/0268126 A1 | | 12/2004 | Dogan et al. |
| 2005/0071677 A1 * | | 3/2005 | Khanna et al. .............. 713/201 |
| 2005/0210251 A1 * | | 9/2005 | Nyberg et al. ............... 713/169 |

OTHER PUBLICATIONS

Int'l Search Report for International Application No. PCT/US2004/033477 filed on Oct. 12, 2004.
Key-Exchange Algorithms, "22.5 Encrypted Key Exchange", XP-002309845, Chapter 22, pp. 518-520.
Bellovin and Merritt, "Encrypted Key Exchange: Password-Based Protocols Secure Against Dictionary Attacks", AT&T Bell Laboratories, 1992 IEEE, pp. 72-84.
Paul Funk, EAP Tunneled TLS Authentication Protocol (EAP-TTLS), Funk Software, Inc., Nov. 2002, pp. 1-40.

\* cited by examiner

*Primary Examiner*—Kimyen Vu
*Assistant Examiner*—Suman Debnath
(74) *Attorney, Agent, or Firm*—Tucker Ellis & West LLP

(57) ABSTRACT

A method and implementation is disclosed for secure communication between two or more parties. A secure tunnel is established between parties using an encryption algorithm. An authentication process is performed between parties over the secured tunnel. The provisioning of credentials is thereafter performed between parties.

21 Claims, 1 Drawing Sheet

PROTECTED DYNAMIC PROVISIONING OF CREDENTIALS

BACKGROUND OF THE INVENTION

With the advent of wireless telecommunications, there is an increasing need for the establishment of security to provide privacy to users and to protect confidentiality of network data. When two or more wireless parties (e.g. a network server and a mobile client) wish to establish a level of security, they will typically "authenticate," that is prove to each other that they really are who they say they are. The proof of identity is typically through some form of "credential." These credentials can be used to achieve different goals in the industry. For instance, a "user ID and password" serve as a credential to prove to a computer that a user is valid and thus gain entry to the system. Similarly, in a network, the "user ID and password" are used to prove the client's authenticity to gain access to the network. And credentials are typically used to achieve authentication through one of two types of cryptographic disciplines: "symmetric cryptography" or "asymmetric cryptography."

Symmetric cryptography is based on the use of a "pre-shared secret," in which both parties obtain the secret through some external means; that is, they may rely on a central source for the distribution of a "pre-shared secret", or one of the parties may disclose (through some other protected means) the "pre-shared secret" prior to its use. For example, the pre-shared secret might be a typical "user ID/password" assigned to a user by a network administrator. The security strength of such symmetric cryptography techniques depend on strong "pre-shared secrets" and as such, the use of typical "user ID and password" techniques are often susceptible to dictionary attacks due to the inherent security weakness of passwords.

Asymmetric cryptography is based on newer technologies, such as "Public Key Infrastructure" (PKI) which can enable a "zero knowledge" approach to proof of identification at the cost of higher computational burdens. Furthermore, while providing a higher level of security than possible with symmetric approaches, the public key approaches while it may not require a shared secret between the two parties, must rely on a third party (known as a Certificate Authority) or must also rely on some a priori knowledge to validate the authenticity of the public key. Hence, PKI techniques are far more costly, and may be prohibitively expensive to implement on some wireless networks. Additionally, the public key approaches often requires a third party to authenticate the PKI credentials.

In summary, whether symmetric or asymmetric cryptography techniques are used to authenticate two parties, some established data or fingerprint must be common between such two parties. In the case of a symmetric cryptography scheme, a pre-shared secret must be mutually shared; whereas in the asymmetric cryptography either require a third party for certificate validation or a fingerprint to be provided to each party before the authentication can ensue. Today's solutions, whether it is in the wireless or wired communications, both schemes rely on a manual configuration or installation of such information. When symmetric cryptography techniques are used, the pre-shared-secrets are provided through external tools that often prove burdensome. Asymmetric cryptography techniques typically rely on the use of certificates (such as the ANSI X.509 certificate) and PKI that must be either validated by a trusted third party or must rely on the manual configuration of fingerprints used to validate a certificate. Thus, there is not a currently existing solution available that enables the distribution of such information (pre-shared-secret or certificate or fingerprint) in a protected and dynamic means. Tools in the trade today often demand an out-of-band or manual configuration for such information.

SUMMARY OF THE INVENTION

The difficulties and drawbacks encountered with previous-type approaches are overcome by the present method and implementation for distribution or provisioning of information used to authenticate two parties. A secure tunnel is established between parties using an encryption. The provisioning of credentials is thereafter performed between the parties An authentication process can be performed between parties over the secured tunnel to ensure proper authorization prior to distribution of said credentials.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
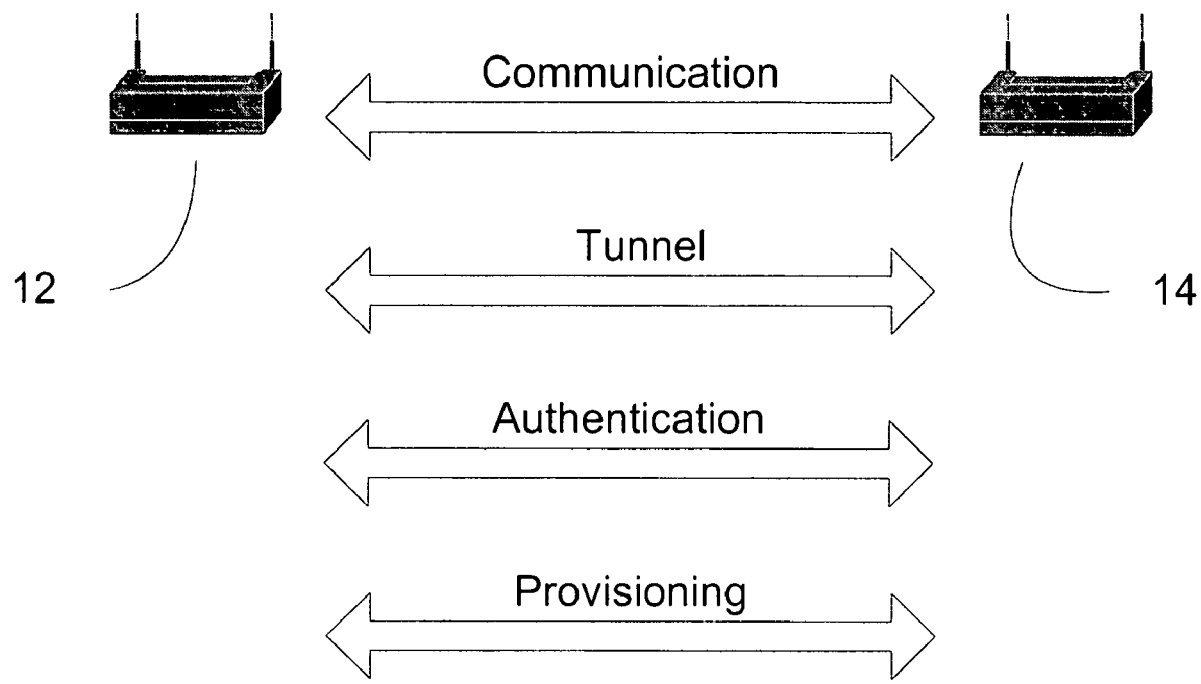
FIG. 1 generally depict the operational steps of the presently disclosed method and implementation.

As disclosed herein, the present invention discloses a provisioning method that allows for the use of an encryption technique used to protect the communications required to attain the authorization by the server to distribute a set of credentials to a client. While the invention can be particularly applicable to wireless approaches, it can also be used in wired network applications, without departing from the invention. In one embodiment of the invention, the protected communications is achieved by employing a Diffie-Hellman key exchange between the first and second parties 12, 14 to mutually derive a shared secret. Of course, it should be appreciated that any scheme other than the Diffie-Hellman approach can be used without departing from the invention. The shared secret establishes a secure channel, protected by the shared secret. The parties 12, 14 then proceed to authenticate each others credentials to ensure that they haven't each been really talking to an active third-party attacker and that they are both the intended client and server. Further, by performing the authentication sequence over a secure channel protected by the shared secret, they do not run the risk of a passive third-party attacker attacking the authentication exchange. Once the authentication succeeds, the server may then provision the client with a different set of credentials.

If the Diffie Hellman key exchange is not authenticated and in the event that for some reason the authentication sequence inside the protected communication fails, a compromise solution is available to parties 12, 14. A number of compromise implementations are available that would be dependent on the policies established by a particular network. In one scenario, parties 12, 14 may assume not only that the shared secret used to authenticate has been compromised. In such a case, where the second party 14 is a mobile client and the first party 12 is a server, the server 12 may invalidate the client's 14 credentials and require the client 14 to reestablish them over an out-of-band channel.

An additional level of security may be obtained by enabling the client 14 to authenticate the server 12. This benefit may be obtained by provisioning credentials from a central authority, e.g. having a system administrator provision a public/private key pair on the server, and then to provision that public key on all the clients. In this way, the DH key agreement may validate the server's authenticity by use of its public key to validate a fingerprint or signature provided by the server to the client at the time it also presents the DH parameters. And though additional costs are required in implementing such a public/private key pair, such a solution would obviate the need for a complete PKI rollout, which would not entail the full expense of such a solution for the end-user. It should be noted that the present approach also enables the use of a full server certificate as well, should deployments implore the use of PKI. Further, it should be noted that the present approach can allow for any key exchange mechanism of any method that provides for mutual derivation of a shared secret but must guard against MitM attacks. The Diffie Hellman key agreement is chosen as an embodiment as it enables a secure key agreement mechanism; to mitigate possible MitM attacks on Diffie Hellman, this embodiment further enables the use of a server side public/private key pair to be used to sign the DH parameters as a means to authenticate the server. Further, a secondary authentication mechanism is used to enable the client to prove authenticity by means of weaker authentication mechanisms. The authentication can be any type of authentication mechanism, but in the preferred embodiment, Microsoft MSCHAP v2 would be used. The authentication phase is used at present to defend against MitM attacks, and is intended to provide any indication for access control. The final guard against the MitM is in the inclusion of a hashed value that binds the cryptographic results from both the Diffie Hellman key agreement and MSCHAPv2 to ensure that both parties 12, 14 succeeded in all the message exchanges (e.g. M was not present).

Particulars of the Preferred Embodiment

The invention will now be described in terms of a preferred embodiment in which an Authenticated Diffie-Hellman Protocol (ADHP) is used to establish a secure tunnel in a wireless application, and where it is appreciated that a secure tunnel is not limited to the Diffie-Hellman approach. The presently disclosed ADHP is preferably a part of a protocol intended to supercede current protocols used in wireless transmissions in accordance with the IEEE 802.11 standards. ADHP provides an in-band mechanism by which end-users can be provisioned with credentials without requiring any input beyond a username and password.

ADHP preferably uses the EAP-TLS protocol to establish a secure tunnel by means of a Diffie-Hellman (DH) key agreement exchange. Once a tunnel is secured between the two parties, the client and server can then execute an authentication method by which both parties can achieve mutual authentication. The Diffie-Hellman key agreement can be achieved by negotiating the tunnel establishment in one of two DH TLS negotiations:

TLS_DH_anon_WITH_AES_128_CBC_SHA in which the peer and the authentication server establish a tunnel without verifying the authenticity of either party; and TLS_DHE_RSA_WITH_AES_128_CBC_SHA in which the server is afforded the opportunity to provide a signature when it provides the DH parameters. When using a signed ephemeral DH with a signature, it is understood that the signature is using the RSA specified algorithm and that the RSA public key has been properly provisioned to the client through some other independent secure mechanism prior to the client negotiating ADHP with signed ephemeral DH. It is also understood that the server may provide full disclosure of it's identity through the use of a certificate. As the tunnel establishment step may not achieve mutual authentication, ADHP also employs an MSCHAPv2 exchange to achieve mutual authentication before a credential can be provisioned.

ADHP is preferably negotiated solely by the client as the first communication exchange when a secure channel is requested from the server. If the client does not have the required credential, it can request to initiate an ADHP exchange to dynamically obtain one from the server. An example of a successful ADHP exchange is depicted as follows:

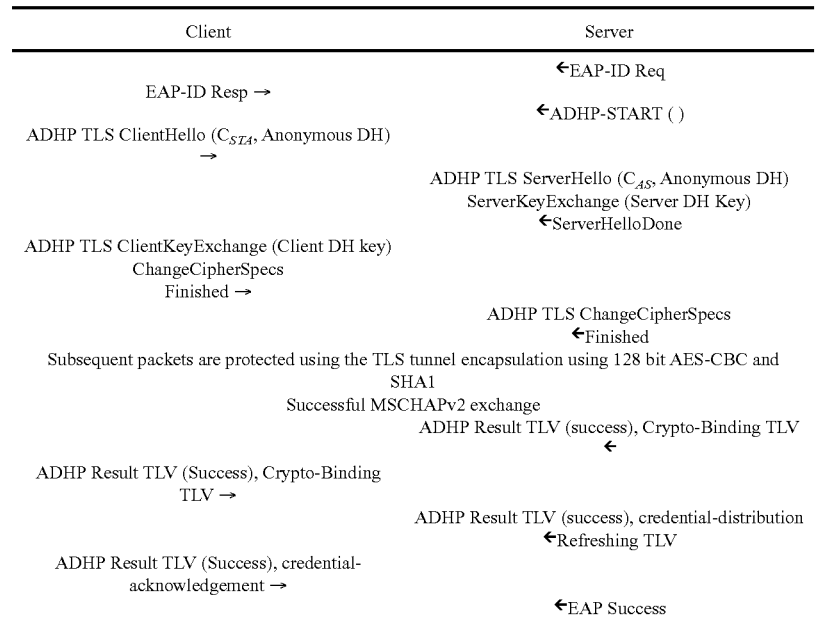

Since the ultimate goal is to enable network access for a peer, the conversation begins with the authenticator and the peer negotiating EAP. The authenticator will typically send an EAP-Request/Identity packet to the peer, and the peer will respond with an EAP-Response/Identity packet to the authenticator containing an EAP identity. With ADHP, the EAP identity may be anonymous to further protect the client's identity. For ADHP, the conversation will typically occur between the peer and an authentication server, which is preferably the server that can provision the peer with a unique credential.

The conversation between a peer and authentication server commences as a normal ADHP exchange: with an anonymous Identity for a wireless peer and the server determining that ADHP authentication is to occur, the EAP server MUST respond with a ADHP/Start packet. Assuming that the peer supports ADHP and the peer has no credential provisioned on its device, the peer shall send an EAP-Response packet with EAP-Type=ADHP. Furthermore, the peer shall initiate the dynamic provisioning phase of ADHP by negotiating in its TLS ClientHello a Diffie-Hellman based Ciphersuite, in this particular version of ADHP, the TLS CipherSuite of TLS_DH_anon_WITH_AES_128_CBC_SHA as defined in RFC 3268 is preferably used. Thus, the peer's response will include both a 128 bit client random value, $C_{STA}$ and the TLS_DH_anon_WITH_AES_128_CBC_SHA to denote that an anonymous DH key agreement exchange will ensue to establish a protected tunnel. The protected tunnel shall user 128 bit AES-CBC for confidentiality and HMAC-SHA1 for message authenticity.

On receipt of the ClientHello message, the server will then respond in kind by providing the following:

In the ServerHello record:
CipherSuite=TLS_DH_anon_WITH_AES_128_CBC_SHA (per RFC 3268)
Random=16 octet server generated random value
In the ServerKeyExchange record:
KeyExchangeAlgorithm=diffie_hellman
ServerDHParams={dh_p, dh_g, dh_Ys}

The ServerHelloDone record is used to signal the end of the ServerHello sequence to be complete.

When an anonymous key exchange is negotiated, the sha_ hash of the records shall be used as its signature. If a signed key exchange is negotiated, then the DH parameters are signed using the server's private key and provided by the server in a signature. An embodiment is also contemplated in that, if the client is able to verify certificates, ADHP can be enhanced to further support the CipherSuite TLS_DHE_RSA_WITH_AES_128_CBC_SHA or TLS_DH_RSA_WITH_AES_128_CBC_SHA as well and allow for the server to provide in it's ServerHello, a valid x.509 certificate that includes both the DH parameters as well as the certificate (RSA-based) signature for the peer to validate the Server's authenticity. To provide best security practices, it is highly recommended that the server provide an RSA signature in the parameter signature or in a separateServer certificate to enable server-side authentication. Additionally, the server may provide it's full identity through the transmission of it's certificate. However, as not all devices will be able to support the infrastructure required to cope with the certificate and it's validation, the use of the certificate or server's public key is provided as a security versus performance tradeoff.

Once the peer has received the ServerDHParams from the ServerHello message, the peer holds all the information required to generate the master_secret and tunnel keys. The peer must generate the master_secret according to RFC 2246 based on both challenges, $C_{STA}$ and $C_{AS}$, and the server and peer's public DH keys. The peer must also respond with ClientKeyExchange to provide the server with the peer's public DH key and with Finished to prove it has generated the correct master_secret.

Upon receipt of the ClientKeyExchange from the peer, the server must generate the master_secret from the given $C_{STA}$ and $C_{AS}$, and the server and peer's public DH keys. It must verify the peer's Finished digest and generate it's own. The server must respond with ChangeCipherSpec and Finished to acknowledge success of the tunnel establishment and liveness of the master_secret.

Once this exchange has successfully completed, subsequent messages exchanged between peer and authentication server are protected using 128 bit AES in CBC mode and HMAC-SHA1 as defined by both RFC 2246 and RFC 3268.

With a protected tunnel, the peer must now authenticate itself to the server before the server can provision it with a network access credential. To facilitate the peer authentication, the <username, password> credentials are used. To enable the client to detect a potential man-in-the-middle attack when there is no authentication in the DH key agreement, an MSCHAPv2 is preferably used.

The client authentication proceeds by the peer and authentication server engaging in an MSCHAPv2 conversation invoking the MSCHAPv2 conversation. To further mitigate "Man-in-the-Middle" attacks, the challenges provided by the peer and authentication server are generated as part of the TLS establishment in ADHP and conveyed as the Server and Client Challenges requested by MSCHAPv2. Note however, while the random challenges are used, they are not transmitted in the actual ADHP communication of the MSCHAPv2 messages (these values may be zeroed out and ignored by the client and server).

Following a successful MSCHAPv2 authentication exchange, the server and the client must prove that they ensued in both the tunnel establishment and MSCHAPv2 conversations by hashing the resulting keys of both conversations. If both parties prove that they have computed the same hashing result, the server can then provision the peer with a unique credential. Note that any type of credential or set of credentials can be provisioned at this step. On concluding the distribution of the credential or set of credentials, ADHP concludes with an authorization failure, to signal that while credentials have been provisioned, network access is denied until the parties ensue in an actual authentication (versus) provisioning protocol.

When generating keys, the DH computation is used as the pre_master_secret and is converted into the master_secret as specified by RFC 2246:

pre_master_secret=$(DH\_YS)^{Peer-Private-DH-key}$ mod DH_p for the client pre_master_secret=$(DH\_Yc)^{server-Private-DH-key}$ mod DH_p for the server master_secret=PRF(pre_master_secret, "master secret", ClientHello.random+ServerHello.random)

The TLS tunnel key is calculated similar to the TLS key calculation with an extra 32 generated which to be used in the MSCHAPv2 exchange. To generate the key material, the following is to be computed:

key_block=PRF(SecurityParameters.master_secret,
    "key expansion",
    SecurityParameters.server_random+
    SecurityParameters.client_random);

until enough output has been generated. Then the key_block is partitioned as follows:

client_write_MAC_secret[hash_size]
    server_write_MAC_secret[hash_size]
    client_write_key[Key_material_length]
    server_write_key[key_material_length]
    client_write_IV[IV_size]
    server_write_IV[IV_size]
    MSCHAPv2 ServerChallenge
    MSCHAPv2 ClientChallenge The extra key material, ServerChallenge and ClientChallenge correspond to the authentication server's MSCHAPv2 challenge and the peer's MSCHAPv2 challenge respectively.

For authenticating using a peer's <username, password>, while other authentication methods exist to achieve mutual authentication, MSCHAPv2 was chosen to prevent a man-in-the-middle (MITM) from gaining the cleartext password and identity on the client's initial response. The MSCHAPv2 forces a MITM to actively mount a dictionary attack to successfully respond to the client's challenge response.

The MSCHAPv2 exchange forces the server to provide a valid ServerChallengeResponse which must be a function of the server challenge, client challenge and password as part of its response. This reduces the window of vulnerability in the ADHP protocol to force the man-in-the-middle, acting as the server, to successfully break the password within the client's challenge response time limit. Further, the random values used by both the client and server to compute their respective challenge responses are further protected from a MITM as they are values resulting from a successful DH key agreement.

The present invention addresses security considerations for wireless media, where the medium itself is inherently susceptible to eavesdropping. Whereas in wired media, an attacker would have to gain physical access to the wired medium; wireless media enables anyone to capture information as it is transmitted over the air, enabling passive attacks. Thus, physical security can not be assumed and security vulnerabilities are far greater.

MitM attacks are also addressed by generating MSCHAPv2 server and client challenges as a function of the DH key agreement. In enforcing the dependence of the MSCHAPv2 challenges on the DH exchange, a MitM is prevented from successfully establishing a secure tunnel with both the peer and legitimate server and succeed in obtaining the credential. By cryptographically binding key material generated in all methods, peer and AS are assured that they were the sole participants of all transpired methods.

Since the peer specifies the means for securing the communications for the provisioning; as such, it can invoke the DH key agreement in one of two ways: anonymously or server-authenticated. With a server-authenticated DH key agreement, the server must provide an RSA signature with the ephemeral DH parameters, whereas no signature is provided for an anonymous DH key agreement.

In a server authenticated DH key agreement, the protected communications are assured that the AS is authentic as the peer must have been pre-provisioned with the AS public (RSA) key prior to the negotiation. As it is the client that must first provide proof of identity through an identity and (password) credential, an adversary may only pose as an AS to successfully mount a dictionary attack. In order to comply the ADHP protocol, an implementation must assure that provisioning of the AS public key (or root certificate) to the peer must be achieved through a secure mechanism outside the scope of the protocol. Only through that mechanism can server-authenticated DH key agreement provide resistance to dictionary attacks. In an anonymous DH key agreement, an adversary may attempt to impersonate a client and enable TEAP for provisioning. However, it must successfully authenticate inside the DH tunnel to succeed and gain the credential from a server. Thus, peer impersonation is mitigated through the enabling of peer authentication inside a protected tunnel. However, an adversary may impersonate and gain the peer's identity and credentials. While the adversary must successfully gain contact with a peer that is willing to negotiate ADHP for provisioning, this occurrence is feasible and enables an adversary to mount a dictionary attack. For this reason, a ADHP compliant implementation must only support an MSCHAPv2 peer authentication when an anonymous DH key agreement is used for the tunnel establishment.

A peer may detect it is under attack when the AS fails to provide a successful MSCHAPv2 server challenge response. A configurable value designated as the maximum number of sequenced failed attempts should be enforced by the peer to provide the means of minimizing the dictionary attack vulnerability. If after the maximum number of attempts have failed with the same result, the peer must change it's MSCHAPv2 credentials. The peer may choose to use a more secure out-of-band mechanism for NAC provisioning that affords better security than the anonymous DH key agreement. Similarly, the peer may find a means of pre-provisioning the server's public key securely to invoke the server-authenticated DH key agreement. The anonymous DH key agreement is presented as a viable option as there may be deployments that are more confined and willing to accept the risk of an active dictionary attack. Further, it is the only option that requires zero out-of-band provisioning.

The present approach can be further enhanced with Public Key Infrastructure (PKI) in the form of a server-side certificate, which would improve the present solution from a reactive defense to a proactive one.

The present system provides a provisioning protocol which is not vulnerable to passive scanning based dictionary attacks, and does not require PKI. At the same time, however, it can only detect potential MitM attacks after the fact. This can be overcome by simply using public/private keys that eliminate that risk, which may be a more than acceptable trade-off compared to the cost of fully-scalable PKI. Similarly, if best security practices can be applied, a full server certificate may be used for best server authentication.

Since the presently disclosed approach employs an initial phase of exchange that is unencrypted, it is possible to identify whether an attacker is also using a key exchange mechanism which is vulnerable to MitM attacks. Then, while the authentication stream is through an encrypted tunnel, access to the authentication server can be monitored, which would enable the detection of an attacker tunneling an authentication phase. In this way, other use of the present system can be detected.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. A method of secure communication comprising:
   establishing a secure tunnel between a server of an associated network and a peer using an encryption algorithm that establishes a server encryption key possessed by the server and a peer encryption key possessed by the peer;
   authenticating the peer with the server over the secured tunnel establishing a server authentication key possessed by the server and a peer authentication key possessed by the peer;
   hashing the server encryption key and the server authentication key to produce a first hash;
   hashing the peer encryption key and the peer authentication key to produce a second hash;
   verifying by the server that the peer possesses the same encryption and authentication keys as the server by comparing the first hash with the second hash;
   distributing a network access credential from the server to the peer using the secured tunnel, responsive to the verifying the peer possesses the same encryption and authentication keys as the server; and
   signaling an authorization failure to the peer in accordance with the distributing of the network access credential, prior to the peer authenticating with the associated network using the distributed network access credential, and denying by the server access to the network by the peer until the peer authenticates with the associated network using the distributed network access credential.

2. The method of claim 1 wherein the communication implementation between the at least first and second parties is at least one of a wired implementation and a wireless implementation.

3. The method of claim 1 wherein the encryption algorithm is an asymmetric encryption algorithm.

4. The method of claim 3 wherein the asymmetric encryption algorithm is used to derive a shared secret, subsequently used in the step of establishing a secure tunnel.

5. The method of claim 3 wherein: the asymmetric encryption algorithm is Diffie-Hellman key exchange; and, the secure tunnel is a Diffie-Hellman tunnel.

6. The method of claim 1 wherein the step of authenticating the peer is performed using Microsoft MS-CHAP v2.

7. The method of claim 1 further comprising a step of provisioning a public/private key pair on one of the at least first and second parties, and then to provision that public key on the respective remaining ones of the at least first and second parties.

8. The method of claim 7 wherein the step of provisioning a public/private key pair comprises providing a server-side certificate in accordance with Public Key Infrastructure (PKI).

9. The method of claim 1, further comprising invalidating a secure credential for the peer responsive to a failure of one of the group consisting of: the establishing the secure tunnel between the server and the peer, the authenticating the peer with the server over the secure tunnel, and the verifying that the peer has the same encryption and authentication keys as the server.

10. The method of claim 5, further comprising:
    detecting a man-in-the-middle attack over the Diffie-Hellman tunnel; and
    selecting an alternate asymmetric encryption algorithm responsive to detecting the attack.

11. The method of claim 5, wherein the Diffie-Hellman key exchange is one of server-authenticated or anonymous.

12. The method of claim 1, further including:
    during the authorizing, monitoring access to the server over the secured tunnel; and,
    determining an attack tunneling in accordance with the monitoring.

13. A system for enabling secure communication between a peer and a server of an associated network, the system comprising:
    means for establishing a secure tunnel between the server and the peer using an encryption algorithm that establishes a server encryption key possessed by the server and a peer encryption key possessed by the peer;
    means for authenticating the peer with the server by cryptography with a server authentication key possessed by the server and a peer authentication key possessed by the peer;
    means for hashing the server encryption key and the server authentication key to produce a first hash;
    means for hashing the peer encryption key and the peer authentication key to produce a second hash;
    means for verifying by the server that the peer possesses the same encryption and authentication keys as the server by comparing the first hash with the second hash;
    means for distributing a network access credential from the server to the peer via the secure tunnel responsive to successfully authenticating the peer and verifying by the server that the peer possesses the same encryption and authentication keys; and
    means for signaling an authorization failure to the peer in accordance with the distributing of the network access credential, prior to the peer authenticating with the associated network using the distributed network access credential, and denying by the server access to the network by the peer until the peer authenticates using the distributed network access credential.

14. The system of claim 13 wherein the means for enabling communication between server and peer is at least one of a wired implementation and a wireless implementation.

15. The system of claim 13 wherein the encryption algorithm is an asymmetric encryption algorithm.

16. The system of claim 15 wherein the asymmetric encryption algorithm is used to derive a shared secret, subsequently used in the step of establishing a secure tunnel.

17. The system of claim 15 wherein the asymmetric encryption algorithm is Diffie-Hellman key exchange.

18. The implementation of claim 13 wherein the implementation for authenticating comprises Microsoft MS-CHAP v2.

19. The system of claim 13 further comprising means for provisioning a public/private key pair on one of the at least server and peer, and then to provision that public key on the respective remaining ones of the at least server and peer.

20. The system of claim 19 wherein the means for provisioning a public/private key pair comprises means for providing a server-side certificate in accordance with Public Key Infrastructure (PKI).

21. The system of claim 13 further including:
    means for monitoring, during the authorizing, access to the server over the secured tunnel; and,
    means for determining an attack tunneling in accordance with a signal from the means for monitoring.

* * * * *